Patented Mar. 6, 1928.

1,661,568

UNITED STATES PATENT OFFICE.

RALPH W. FRENCH AND WALTER C. HOLMES, OF WASHINGTON, DISTRICT OF COLUMBIA, ASSIGNORS TO WILLIAM F. KEOHAN, TRUSTEE, OF WASHINGTON, DISTRICT OF COLUMBIA.

BIOLOGICAL STAINS, BACTERIOCIDAL AGENTS AND THE LIKE, AND METHODS OF PREPARING THE SAME.

No Drawing.   Application filed February 9, 1926.   Serial No. 87,166.

This invention relates to certain novel bacteriocidal and therapeutic agents, biological stains and the like and to methods of producing the same.

It is known to those skilled in the art to which this invention relates, that certain dye or stain mixtures have been heretofore advantageously used in connection with certain lines of diagnoses, bacteriocidal or germicidal investigations and similar technic work, and we have found that agents possessing the necessary characteristics for this class of work may be produced by causing reactions between any of the so-called basic dyes and cyclic compounds or derivatives containing phenolic or acid groups, and that the products resulting from such reactions, when used in the manner indicated, exhibit stronger germicidal characteristics, and more therapeutic potency, and are more efficient and easier to work as biological stains than the agents heretofore used for these purposes.

Experiments have shown that basic dyes of substantially all classes or groups may be used in the production of the agents forming the subject matter of the present invention, and the following groups of dyes are named to illustrate, by way of example, some of the classes, whose basic dyes have been found to react in a manner such as to produce agents having the desired characteristics, namely, azo, thiazole, ketonimide, triphenylmethane, diphenylnaphthylmethane, xanthene, acridine, azine, oxazine, thiazine or pyridine derivatives.

In this connection attention is directed to the fact that all reactive forms of the basic dyes, including the dye or color bases, leuco compounds, acetyl derivatives, and colorless or less intensely colored isomers of the dyes are, for the purposes of the present invention, considered to be the full equivalents of the basic dyes themselves. As examples of compounds of this nature that may be used to advantage, the following are given: Bismark brown R, thioflavine T, auramine O, brilliant green, rosaniline base, acriflavine, methyl violet base, benzyl violet, rhodamine B, safranine T, new blue DA, thionine and pinachrome. It is of course apparent that it is neither practical or necessary to enumerate here all of the basic dyes, and all of the color bases, leuco compounds, acetyl derivatives and isomers of the dyes that are suitable for use in connection with the present process, and therefore it is to be understood that the foregoing compositions have been named by way of example only, and are not to be construed as excluding similar compositions not named, for as above indicated, basic dyes of all classes and groups and their corresponding color bases, leuco compounds, acetyl derivatives and isomers may be used if desired.

As hereinbefore suggested the basic dyes or their equivalents, are caused to react with cyclic compounds or derivatives containing phenolic or acid groups, such as for instance, any of the derivatives of the benzene, naphthalene, anthracene, pyridine, or quinoline series, or other parent organic substance, the ring structure of which contains phenolic or acid groups, it being noted that for the purposes of the present invention all compounds containing substituted phenolic or acid groups, are considered to be the full equivalent of the original derivatives themselves. By way of example of compounds containing unsubstituted phenolic or acid groups, and substituted phenolic or acid groups which latter are considered the full equivalents of the original derivatives, the following are given: phenol, cresol, resorcin, catechin, hydroquinone, guaiacol, phloroglucin, pyrogallol, metol, p-aminophenol, chloramine T, benzoic acid, sodium benzoate, salicylic acid, sodium salicylate, phthalic acid, gallic acid, quinolinic acid, anthranilic acid, $\beta$-naphthol, N.W. acid (Neville and Winter's acid: 1-naphthol-4-sulfonic acid), H acid (1.8 diamino-3.6-disulfonic acid), and G salt (the sodium salt of 2-naphthol-6.8-disulfonic acid.)

The suggested reaction between one or more of the basic dyes or their equivalents, and one or more of the cyclic compounds or their equivalents, by which the agents forming the present invention are produced, may be accomplished in either of several ways, such as by direct fusion of the ingredients; or by combining aqueous or other suitable solutions of the ingredients with or without the application of heat, and then recovering the resulting reaction product either by filtration or by evaporation of the solvents; or if desired a suitable mechanical mixture of the components in a dry state may be made and retained as such until a reaction product is desired, at which time the product may be readily produced by forming a solution of the mixture.

As an example of the procedure last suggested, a mechanical mixture of one molecular equivalent of crystal violet and two molecular equivalents of resorcin may be prepared and kept as such, until such time as it is desired to form the reaction product, at which time the mixture may be dissolved in water, and used as such, it being obvious that the agents are most generally made use of in the form of solutions.

Other examples of the use of particular components, and convenient methods of utilizing them are given below:

1. To a hot and nearly saturated aqueous solution of crystal violet (hydrochloride) is added a solution containing two molecular equivalents of hydroquinone in a minimum quantity of hot water. The solution is cooled and the reaction product obtained by filtration.

2. Dry methylene blue (hydrochloride) is mixed with one molecular equivalent of dry resorcin and the mixture fused and cooled.

3. Ethyl violet (hydrochloride) is dissolved in a minimum amount of alcohol together with two molecular equivalents of phthalic acid and the solution evaporated to dryness.

4. Dry new fuchsine base is mixed with three molecular equivalents of dry phenol and the mixture fused and cooled.

While the exact nature of the reactions occurring between the basic dyes or their equivalents and the cyclic compounds or their equivalents is not definitely known, it is thought that the reaction products produced are in the nature of addition compounds in which the constituent ingredients are combined in molecular proportions, but be this as it may, experiments have indicated that whatever may be the particular molecular construction or chemical composition of the resulting products, similar reactions may be made to occur between any of the various reactive forms of any of the basic dyes and any of the cyclic compounds containing phenolic or acid groups, and that such reactions will yield agents having the characteristic requisite for use in the manner and for the purposes indicated, and in a substantially greater degree than has been possessed by agents which have heretofore been used for these purposes. It is to be understood, therefore, that the terms "reactive form of a basic dye" and "cyclic compounds containing acid groups" as used in this specification and in the claims appended hereto, are to be interpreted broadly as including all forms of all basic dyes and all cyclic compounds containing acid groups of any character, since we are not aware of any previous attempts having been made to produce reaction products of the character described from a combination of compounds of this nature.

In conclusion it is to be noted that while the foregoing specification gives the names of various compounds which may be utilized in the production of agents designed for use as biological stains, therapeutic and bacteriocidal agents, and the like, and also describes several convenient methods of preparing such agents, it is to be understood that this specification is for the purpose of example and illustration only and not as defining the limits of the invention, which are to be determined from the scope of the appended claims.

Having thus described our invention, what we claim as new is:—

1. A product of the character described comprising the combination of a water-soluble reactive form of a basic dye and a cyclic compound containing acid groups.

2. A product of the character described containing the combination of a reactive form of a basic dye and a cyclic compound containing phenolic groups.

3. A product of the character described comprising the combination of an acetyl derivative of a basic dye and a cyclic compound containing acid groups.

4. A product of the character described, comprising the combination of an acetyl derivative of a basic dye and a cyclic compound containing phenolic groups.

5. The process of producing reaction compounds which consists in causing a reaction between a water-soluble reactive form of a basic dye and a cyclic compound containing acid groups.

6. The process of producing reaction compounds which consists in causing a reaction between a reactive form of a basic dye and a cyclic compound containing phenolic groups.

7. The process of producing reaction compounds which consists in causing a reaction between an acetyl derivative of a basic dye and a cyclic compound containing acid groups.

8. The process of producing reaction compounds which consists in causing a reaction between an acetyl derivative of a basic dye and a cyclic compound containing phenolic groups.

9. The process of producing reaction compounds which consists in precipitating the same from a combined solution of a water-soluble reactive form of a basic dye and a cyclic compound containing acid groups.

10. The process of producing reaction compounds which consists in precipitating the same from a combined solution of a reactive form of a basic dye and a cyclic compound containing phenolic groups.

11. The step in the process of producing reaction compounds which consists in forming a mechanical mixture of a water-soluble reactive form of a basic dye and a cyclic compound containing acid groups.

12. The step in the process of producing reaction compounds which consists in forming a mechanical mixture of a reactive form of a basic dye and a cyclic compound containing phenolic groups.

13. The step in the process of producing reaction compounds which consists in forming a mechanical mixture of an acetyl derivative of a basic dye and a cyclic compound containing acid groups.

14. The step in the process of producing reaction compounds which consists in forming a mechanical mixture of an acetyl derivative of a basic dye and a cyclic compound containing phenolic groups.

15. The process of producing reaction compounds which consists in precipitating the same from a combined solution of an acetyl derivative of a basic dye and a cyclic compound containing acid groups.

16. The process of producing reaction compounds which consists in precipitating the same from a combined solution of an acetyl derivative of a basic dye and a cyclic compound containing phenolic groups.

In testimony whereof we hereunto affix our signatures.

RALPH W. FRENCH.
WALTER C. HOLMES.